Nov. 20, 1951  J. M. TYRNER  2,575,737
GAS TORCH MACHINE FOR CUTTING ROUNDS AND THE LIKE
Filed Aug. 24, 1948  2 SHEETS—SHEET 1

INVENTOR
JOSEPH M. TYRNER
BY
*Pennie, Edmonds, Morton & Barrows*
ATTORNEYS

Nov. 20, 1951 J. M. TYRNER 2,575,737
GAS TORCH MACHINE FOR CUTTING ROUNDS AND THE LIKE
Filed Aug. 24, 1948 2 SHEETS—SHEET 2

INVENTOR
JOSEPH M. TYRNER
BY
Pennie, Edmonds, Morton & Barrows.
ATTORNEYS

Patented Nov. 20, 1951

2,575,737

UNITED STATES PATENT OFFICE 2,575,737

GAS TORCH MACHINE FOR CUTTING ROUNDS AND THE LIKE

Joseph M. Tyrner, New York, N. Y., assignor to Air Reduction Company, Incorporated, a corporation of New York Application August 24, 1948, Serial No. 45,942

4 Claims. (Cl. 266—23)

This invention relates to machines of the gas-torch type for the accurate severing of lengths of metal known as "rounds."

The machine of the invention comprises a simple, inexpensive, and in the smaller sizes a readily portable, device which may be quickly aligned with the workpiece to be cut, and which automatically guides the cutting torch across the workpiece so as to follow the contour thereof and thereby maintain the correct spacing between the torch tip and the workpiece. In accordance with the invention, the cutting torch is connected to one end of a swinging, torch-supporting arm which comprises a parallelogram linkage and which is pivotally connected at its other end to a base for movement about vertical and horizontal axes, the arm being guided during its movement by a cam accurately shaped to correspond to the contour of the workpiece.

A clearer understanding of the invention will be had from consideration of the following description taken together with the drawings, in which.

Figure 1:
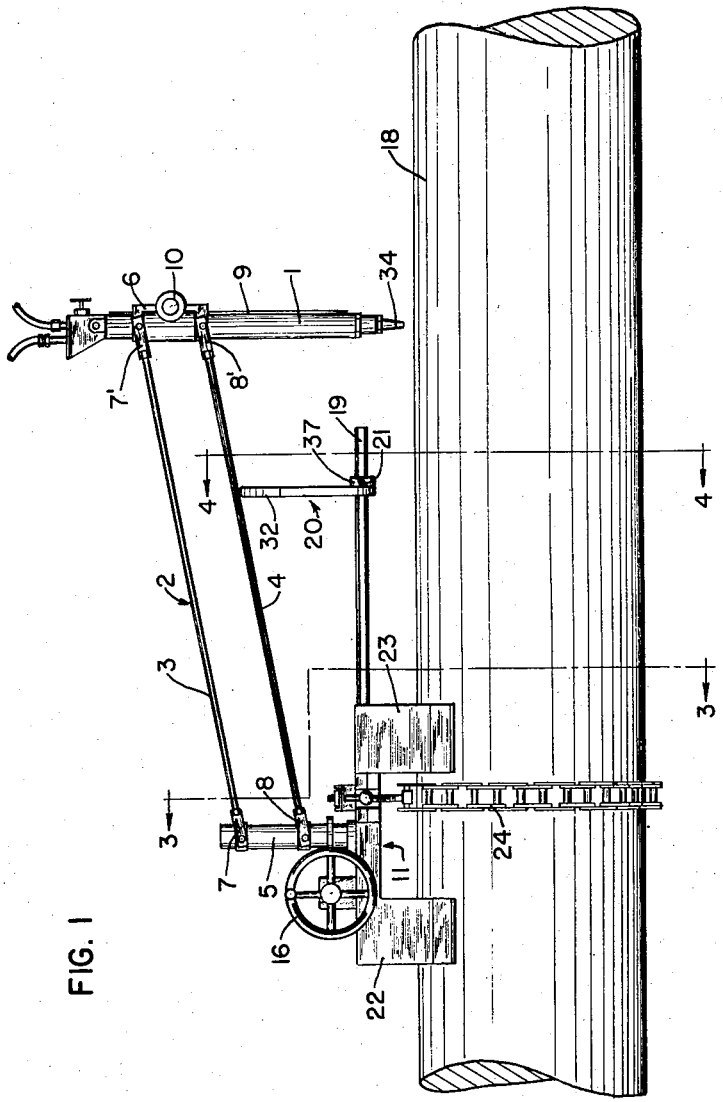
Fig. 1 is a side elevational view of a preferred embodiment of the invention.
Figure 2:
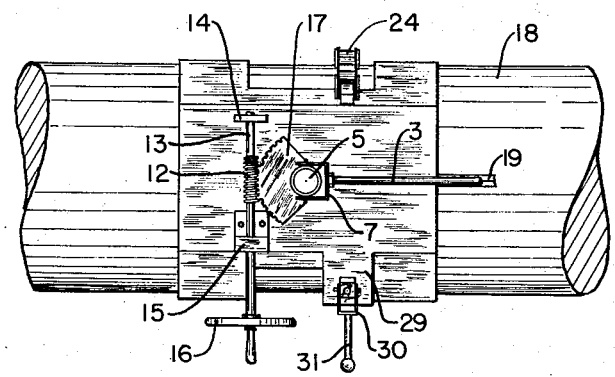
Fig. 2 is a plan view of a portion of the machine illustrated in Fig. 1.

Referring to Fig. 1, a conventional cutting torch 1 of the gas type is mounted on a supporting arm 2 comprising a parallelogram construction which includes an upper link 3 and a lower link 4 spaced parallel to each other, horizontally pivoted at one end to a post 5 and at the other end to a torch holder 6. These pivot connections are effected by means of yokes 7, 7' and 8, 8', on opposite ends of links 3 and 4, respectively. A top view of one such yoke (7) is shown in Fig. 2. Torch 1 is arranged to move longitudinally (vertically) in holder 6 by means of a rack and pinion arrangement. The rack 9 is secured to the side of torch 1, and the pinion (not shown) which engages it is rotated by means of knob 10.

Post 5 is mounted in a base 11 so as to be rotatable on its own vertical axis. The rotation of post 5 is effected by a worm and sector-gear arrangement, shown more clearly in Fig. 2. It comprises a worm gear 12 mounted on axle 13, which is rotatable in journals 14 and 15, by a hand wheel 16. Worm gear 12 meshes with sector-gear 17 which, as shown, is secured to post 5. It will be seen that, by the construction above described, the torch 10 may be manually slid up and down in its holder 6, and that the torch with its holder may be moved up and down with respect to the base 11 and workpiece 18 by swinging the entire supporting arm 2 vertically on the pivots of yokes 7 and 8. Furthermore, the torch will remain effectively locked in any adjusted position because gears 12, 17 are irreversible and torch 1 is frictionally held in holder 6. By virtue of the nature of the parallelogram linkage, the longitudinal axis of the torch 1 will at all positions remain parallel to the longitudinal axis of post 5. Rotation of hand wheel 16 causes sector gear 17 to rotate the post 5 on its own vertical axis and thus to swing supporting arm 2 on the same axis. By this means, torch 1 is movable across the workpiece at any desired rate.

Attached to one end of base 11 is a hexagonal rod 19 along which a cam plate 20 is arranged to slide but not to rotate. Set screw 21 in boss 31 may be tightened to lock cam plate 20 at any desired position along rod 19. When arm 2 is centrally positioned, as illustrated in Fig. 2, rod 19 is directly below, and in the same vertical plane with links 3 and 4 of arm 2. Link 4 may be held against cam 32 by gravity, as shown, or a tension spring secured by its ends to link 4 and base 11 may be employed.

Base 11 includes two inverted-V-shaped foot portions 22 and 23, of which the inside surfaces are hardened and serrated to permit the cutting machine to be tightly secured to the workpiece. By forming the foot portions 22, 23 symmetrically, as illustrated in Figs. 3 and 4, and by proportioning and mounting the remaining components of the machine so as to be symmetrical with respect to the center of the V, the mere clamping of the machine to the workpiece will automatically align it with the center or diameter of any workpiece having a symmetrical cross-section.

The machine may be arranged to straddle the workpiece, or it may be clamped to it by any suitable means, although the clamping device here illustrated has proved to be satisfactory. It comprises a link chain 24 secured at one end to one side of the base 11 by an anchor hook 25, and at the other end to the opposite side of base 11 by means of adjustable clamp 26. Clamp 26 comprises a block 27 having a central, threaded hole to permit the block to receive a threaded rod 28. The free end of chain 24 is pivoted to the lower end of rod 28 so that, when this rod is drawn upwardly, the chain will be drawn tightly around the workpiece. Block 27 bears on the upper surface of a bifurcated lug 29 which is integral with base 11. As shown in Figs. 2 and 3, the yoke 30 is pivoted to block 27. Attached to the yoke is a handle 31 by which block 27 may be rotated. Thus, by swinging the chain 24 around beneath the workpiece, passing rod 28 into the slot in lug 29 and then screwing down the block 27, the machine may be rapidly and firmly secured at any desired location on the workpiece.

Figures 3, 4:
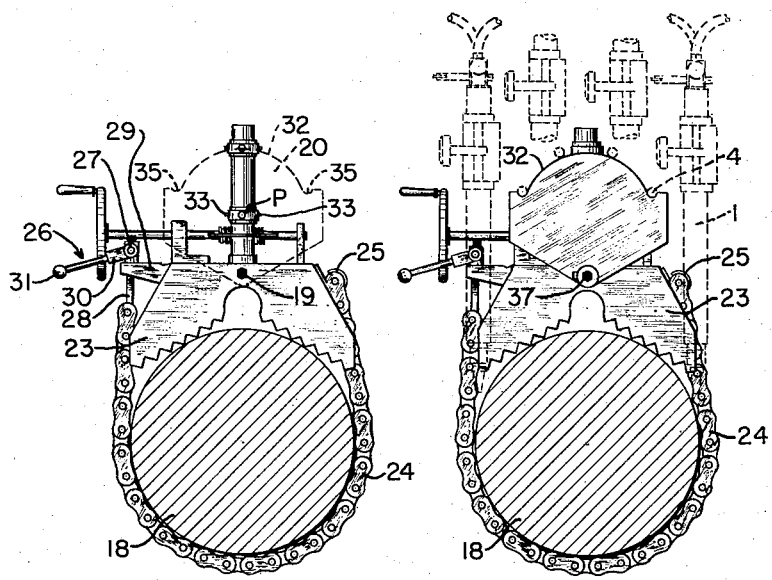
Fig. 3 is a sectional view taken along the line 3—3 of Fig. 1.
Fig. 4 is a sectional view taken along the line 4—4 of Fig. 1.

The nature and form of cam plate 20 is illustrated in Figs. 1, 3 and 4. In Fig. 3, this plate is represented in dotted outline superimposed upon the sectional view for the purpose of showing its position and outline relative to certain other parts of the machine. The workpiece here illustrated is a "round," such as round bar stock, and to cut such a workpiece the cam face 32 of plate 20 should be circular in form. The arc comprising cam surface 32 has as its center the point P, comprising the intersection of the central axis of post 5 with the plane of the pivot pins 33 by which the lower link 4 is pivoted to post 5.

Figure 5:
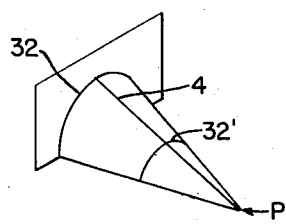
Fig. 5 illustrates diagrammatically the relation of the torch supporting arm and the cam.

The relationship of arc 32, the point P, and the lower link 4 of the torch-supporting arm 2 is represented in the diagram of Fig. 5. In that figure, cam surface 32 is seen to comprise an arc on the base of a right cone of which the point P is the apex and the arm 4 the generatrix. The segment of the cone represented in Fig. 5, is formed by translating the element 4 along arc 32 about the point P. The smaller arc 32' is concentric with the arc 32, but is generated at a point closer to the apex P. Similarly, a still longer arm 4 (generatrix) will generate a larger arc which will also be concentric with the arc 32. From this it will be seen that, by sliding cam plate 20, and thus cam 32, along rod 19, the apex angle and therefore the radius of the arc generated by the link 4, may be adjusted. In this manner torch 1 may be made to follow the contour of a round workpiece of any given diameter with substantially constant spacing from the surface thereof. An equivalent adjustment of the ratio of the radius of the cam surface to the radius of the arc followed by the torch may be had by adjusting the effective length of the torch-supporting arm. Such adjustment of the length of arm 2 may be effected by various means, such as by constructing links 3 and 4 with telescopic sections, or by adding or removing sections of links 3 and 4, if such sections be threaded together. In either event, the change in length should be the same for both links. If the machine is employed for severing shapes other than rounds, the cut will not be straight.

The operation of the machine will be described as it may be employed in cutting a round, such as the workpiece 18 herein illustrated. The machine is first clamped to the workpiece, as above described, in a position such that the cutting tip 34 of the torch 1 is directly over the top center point on the surface of the workpiece when arm 2 is in its central position as seen in Fig. 2. Cam plate 20 is then slid along rod 19 until the arcuate movement of torch tip 34 corresponds to the curvature of the workpiece, at which point set screw 21 is tightened. Knob 10 may thereafter be adjusted to raise or lower the torch to proper spacing from the surface of the workpiece. Then, hand wheel 16 is rotated, swinging the torch tip to the side of the workpiece where it becomes almost tangent thereto. At this point, the lower link 4 will rest in either one of the depressions 35 at the ends of the cam surface 32 (Fig. 3). It being assumed that the desired preheating and cutting gases are supplied through tubes 36 (Fig. 1), the preheat gas may now be turned on and ignited. After the appropriate preheat period, the cutting gas is turned on, and hand wheel 16 is rotated in a direction to move the cutting torch across the workpiece. The proper speed at which the torch should be moved will, of course, depend upon several variables well understood in the art, but this speed may be manually controlled by hand wheel 16, as required. When the torch has arrived at the opposite side of the workpiece, the latter will have been severed. Fig. 4 shows the position of the torch (in dotted lines) with respect to the workpiece 18, as determined by the position of the lower link 4 (in dotted lines) with respect to cam surface 32, at each of four different locations from the beginning to the end of the cut.

From the foregoing discussion, it will be seen that, by employing a cam surface 32 which has a contour similar to that of the surface across which the torch tip must pass, the workpiece may be cut with the assurance that at all points in the torch travel thereacross, the spacing between the torch tip and the surface of the workpiece will be substantially uniform. It will also be evident that, because of the fact that the end of the supporting arm 2 which carries the torch is constrained to move around the base of a right circular cone, the cut will be in a plane normal to the axis of the workpiece. Thus, although the mechanism of the present invention is extremely simple, it is capable of making straight cuts with a high degree of accuracy.

Although the horizontal movement of torch 1 is here shown to be by manual operation of wheel 16 and gears 12 and 17, any other desired motivating mechanism may be substituted to rotate post 5.

Other mechanism equivalent to that herein-described may be substituted with satisfactory results, and the claims should be interpreted accordingly.

What I claim is:

1. A portable cutting machine of the gas torch type for severing rounds comprising a base, clamping means for clamping said base to the round to be cut, a post disposed perpendicularly to said base and axially rotatable thereon, a cutting torch having a tip, a torch support comprising a parallelogram linkage extending longitudinally of the workpiece when the base is clamped to the workpiece and having upper and lower members each pivoted at one end to said post to swing about a horizontal axis whereby each arm is universally movable about the point of intersection of its horizotal pivot axis and the axis of said post, the other end of each of said members being pivotally connected to said torch such that the axis of the torch remains parallel to the axis of said post when the torch is moved vertically, and a cam supported by said base having an arcuate cam face lying in a plane which extends transversely of said parallelogram linkage and which is spaced from said post lengthwise of the parallelogram linkage, the center of curvature of said arcuate cam face being in longitudinal alignment with the point about which said lower member of the parallelogram linkage is universally movable, a part of the lower member of the parallelogram linkage comprising a follower for said cam face whereby movement of the parallelogram linkage about the axis of said post to produce movement of the torch across the workpiece causes the torch tip to move in an arcuate path lying in a plane at right angles to the longitudinal axis of the workpiece.

2. A portable cutting machine of the gas torch type for severing rounds comprising a base, clamping means for clamping said base to the round to be cut, a post disposed perpendicularly to said base and axially rotatable thereon, a cutting torch having a tip, a torch support comprising a parallelogram linkage extending longitudinally of the workpiece when the base is clamped to the workpiece and having upper and lower members each pivoted at one end to said post to swing about a horizontal axis whereby each arm is universally movable about the point of intersection of its horizontal pivot axis and the axis of said post, the other end of each of said members being pivotally connected to said torch such that the axis of the torch remains parallel to the axis of said post when the torch is moved vertically, and cam means acting on a part of one member of the parallelogram linkage so that when the parallelogram linkage is moved about the axis of said post to produce movement of the torch across the workpiece said part of the parallelogram linkage will be guided in an arcuate path the center of which is in longitudinal alignment with the point about which such member of the parallelogram linkage is universally movable, whereby the torch tip will move in an arcuate path lying in a plane at right angles to the longitudinal axis of the workpiece.

3. A cutting machine of the gas torch type for severing rounds comprising a base adapted to be supported on the round to be severed, a torch-supporting arm, a pivot connection by which said arm is pivotally connected to the base and forming a fulcrum point about which the arm is universally pivotable, said arm extending longitudinally of the round when the base is supported thereon, a cutting torch connected to the outer end of said arm, means operative when said arm is moved about said fulcrum point for moving the point at which the torch is connected to said arm in a path which is an arc of a circle bounding the base of a right circular cone of which said arm is the generatrix and said fulcrum point is the apex, and means for maintaining the torch parallel to itself through all operating positions of said torch arm.

4. Apparatus for making a planar cut through a workpiece in a plane perpendicular to the longitudinal axis of said workpiece, comprising a base having a pivot point that is fixed relative to said workpiece, a torch arm pivoted to said base for universal movement about said pivot point, a torch arm guide spaced from said pivot point which cooperates with a point on said torch arm which is a fixed distance along said torch arm from said pivot point to guide said point on said torch arm in an arc of a circle having a center located on a line drawn through said fixed pivot point parallel to the axis of said workpiece, a cutting torch mounted from said torch arm in operative relation to said workpiece, and means for maintaining said torch parallel to itself through all operating positions of said torch arm.

JOSEPH M. TYRNER.

REFERENCES CITED

The following references are of record in the file of this patent:

UNITED STATES PATENTS

| Number | Name | Date |
| --- | --- | --- |
| 60,506 | Guerrant et al. | Dec. 18, 1866 |
| 465,689 | Bradley, Jr. | Dec. 22, 1891 |
| 866,866 | Jottrand | Sept. 24, 1907 |
| 1,687,001 | Bishop | Oct. 9, 1928 |
| 1,860,653 | Brown | May 31, 1932 |
| 2,177,276 | Buchnam | Oct. 24, 1939 |
| 2,242,448 | Buchnam et al. | May 20, 1941 |
| 2,378,017 | Hubkey | June 12, 1945 |
| 2,416,384 | Gibson | Feb. 25, 1947 |
| 2,429,686 | Helmkamp | Oct. 28, 1947 |